(12) United States Patent
Rampersad (10) Patent No.: US 10,919,118 B2
(45) Date of Patent: Feb. 16, 2021

(54) ULTRASONIC SCANNER FOR PIPELINE USE

(71) Applicant: SHAWCOR, LTD., Toronto (CA)

(72) Inventor: Dale Rohan Rampersad, Kingwood, TX (US)

(73) Assignee: Shawcor, Ltd., Toronto (CA)

( * ) Notice: Subject to any disclaimer, the term of this patent is extended or adjusted under 35 U.S.C. 154(b) by 0 days.

(21) Appl. No.: 16/691,210

(22) Filed: Nov. 21, 2019

(65) Prior Publication Data

US 2020/0122277 A1   Apr. 23, 2020

Related U.S. Application Data

(63) Continuation of application No. PCT/CA2019/050548, filed on Apr. 26, 2019.

(60) Provisional application No. 62/663,791, filed on Apr. 27, 2018.

(51) Int. Cl.
| | |
|---|---|
| *G01N 29/26* | (2006.01) |
| *G01N 29/265* | (2006.01) |
| *B23K 31/12* | (2006.01) |
| *B23K 101/10* | (2006.01) |

(52) U.S. Cl.
CPC ......... *B23K 31/125* (2013.01); *G01N 29/262* (2013.01); *G01N 29/265* (2013.01); *B23K 2101/10* (2018.08); *G01N 2291/2634* (2013.01)

(58) Field of Classification Search
CPC .... G01N 29/265; G01N 29/262; G01N 29/26; G01N 2291/2634; G01N 2291/2636; B23K 31/125; B23K 2101/10; B23K 2101/04; B23K 2101/06
USPC ......... 73/588, 620, 622, 618, 633, 634, 640, 73/635, 637
See application file for complete search history.

(56) References Cited

U.S. PATENT DOCUMENTS

| | | | | |
|---|---|---|---|---|
| 3,921,440 | A * | 11/1975 | Toth ..................... | G01N 29/265 73/622 |
| 4,331,034 | A * | 5/1982 | Takeda ................. | G01N 29/265 376/252 |
| 4,760,737 | A * | 8/1988 | Kupperman .......... | G01N 29/11 73/622 |
| 7,284,456 | B2 * | 10/2007 | Lavoie ................. | G21C 17/017 73/866.5 |
| 2012/0204645 | A1 * | 8/2012 | Crumpton ............ | G01N 29/043 73/588 |
| 2013/0255384 | A1 * | 10/2013 | Putsherry ............. | G01N 29/262 73/588 |
| 2015/0300991 | A1 * | 10/2015 | Sword ................... | G01N 29/04 73/618 |
| 2018/0011064 | A1 * | 1/2018 | Furr ................... | G01N 29/4463 |

* cited by examiner

*Primary Examiner* — Stephen D Meier
*Assistant Examiner* — Rose M Miller
(74) *Attorney, Agent, or Firm* — Gregory L. Porter; Hunton Andrews Kurth LLP (57) ABSTRACT

A scanner assembly for pipeline inspection, having a pipe mounting section and a scanner frame which is laterally displaceable with respect to the pipe mounting section.

15 Claims, 9 Drawing Sheets

ULTRASONIC SCANNER FOR PIPELINE USE

FIELD

The present disclosure is related to the field of ultrasonic girth weld inspection, in particular for oil and gas pipelines.

BACKGROUND

An oil and gas pipeline is typically made from a plurality of lengths of coated pipe joined together. The lengths of pipe are typically coated for insulation, impact resistance, water proofing, and corrosion resistance. The coating is often a quite thick layer on top of the steel pipe length. To facilitate welding the pipe lengths together, the coating ends before the steel end of the pipe, leaving a region, often about 600 mm (23.6") wide, of exposed steel pipe, at the ends of the pipe before the coating begins. This is known as the "cutback region".

Pipe lengths are typically welded together in the field, utilizing what is called a "girth weld"—a weld around the perimeter of the steel pipe. Then the cutback region is covered or filled (or both) to provide insulation, impact resistance, water proofing, and corrosion resistance equal to the rest of the pipe coating. As can be appreciated, covering or filling the cutback region in the field is a much more expensive process than coating the pipe at the factory, and typically involves more expensive materials, but a much smaller length of pipe.

Best practices dictate that each girth weld must be inspected to ensure it meets certain quality criteria, before the cutback is filled. There are a variety of methods for girth weld inspection, but one of the most common is an ultrasonic inspection. A metal band is attached around the pipe and an ultrasonic scanner assembly is attached to the band. The scanner assembly, which contains at least one ultrasonic scanner, rotates around the band and scans the weld. The scanner assembly may contain Time of Flight Diffraction or Phased Array sensors which measure imperfections in the weld. The ultrasonic scanners may inspect either or both of the weld sections proximal to the outer diameter and the inner diameter of the pipe.

SUMMARY OF THE INVENTION

According to one aspect of the present invention is provided a scanner assembly for external inspection of a pipeline girth weld, the apparatus comprising:

a pipe mount section, mountable by mounting means to a mounting band affixed to the pipeline and capable of rotating around the circumference of the pipeline by travelling around the mounting band; a scanner frame section, having scanner mounts; wherein the scanner frame section has displacement means relative to the pipe mount section, such that the scanner frame section can be displaced laterally in relation to the pipe mount section when said pipe mount section is affixed to the pipeline.

According to certain embodiments, the displacement means comprise at least one linear ball bearing slide.

According to certain embodiments, each of the scanner mounts comprise a scanner attachment means and a spring loaded mechanism, having a travel distance, for biasing the scanner attachment means towards the pipeline.

According to certain embodiments, the travel distance of the spring loaded mechanism is shorter than a travel distance of the lateral displacement of the scanner frame section.

According to certain embodiments, the scanner assembly has at least four scanner mounts, for example, at least 8 scanner mounts.

According to certain embodiments, the mounting means comprise at least one, preferably a set, of fixed wheels and at least one, preferably a set, of opposing displaceable wheels, configured such that the displaceable wheels can displace to frictionally mount or clamp onto a wheel engagement surface of the mounting band.

According to certain embodiments, the pipe mount section also comprises a track engagement means, driven by a motor, capable of engaging and disengaging with a track running along the circumference of the mounting band.

According to certain embodiments, the scanner mounts are configured on at least two, for example three, rails cantilevered from the pipe mount section to a distal end.

According to certain embodiments, the scanner assembly further comprises an integrated water transportation system.

According to certain embodiments, the integrated water transportation system comprises a metal conduit running along the length of one or more rails.

According to certain embodiments, the scanner assembly has extension rails generally parallel to the rails and extending therefrom.

According to certain embodiments, the extension rails extend from the rails via an articulating or pivoting member, which allows the extension rails to pivot between at least two positions, each accommodating placement onto pipeline of different circumference. The at least two positions may be lockable positions.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In various examples, the present disclosure describes an ultrasonic scanner assembly suitable for inspection of a girth weld. The scanner assembly may be much lighter and easier to carry than scanner assemblies known in the art. The scanner assembly may also be easier to install onto, and off of, a band affixed to the pipe, both due to its weight and to its configuration. The ultrasonic scanner assembly provides attachment points for up to four phased array transducers, as well as up to four Time of Flight Diffraction transducers, and accordingly allows scanning of pipes of greater thickness than prior art configurations, and allows for scanning near both the inner and outer diameter surfaces.

The scanner assembly may easily be mounted on a band, for example, a CRC welding band, which supports the ultrasonic scanner assembly, which travels around the band for inspection of the girth weld.

The CRC bands are usually manufactured from 5" wide spring steel, rolled to a diameter 4" greater than the overall diameter of the pipe. A conventional band used to support the ultrasonic scanner is typically 4"-4.5" or wider, with a weight of about 12-13.5 lb. Other bands may also be used with the disclosed scanner assembly.

The scanner assembly has two major components: a scanner frame section, and a pipe mount section. The scanner frame section comprises mounting means for mounting ultrasonic scanners. The mounting means may be in the form of horseshoe mounts known in the art. The mounting means are affixed to the frame of the scanner frame section in a "spring loaded" manner—that is, they are affixed on mechanical springs or pneumatics, which keep the sensors biased towards the pipe when the scanner assembly is mounted onto a pipe. Unlike prior art scanner assemblies, the scanner frame section can be displaced laterally (in relation to a pipe on which the assembly is affixed) in relation to the pipe mount section. The scanner frame section thus has at least two positions, an open (up) position, where the scanner frame section is laterally relatively distal to the pipe, and a closed (down) position, where the scanner frame section is laterally proximal to the pipe. This makes the assembly much easier to affix to a band on a pipe, by mounting the scanner frame while the scanner frame section is in its open (up) position. Since the lateral displacement of the scanner frame section (with respect to the pipe mount section) is greater than the lateral displacement provided by the spring or pneumatic displacement of the sensors, a user is not fighting against these springs or pneumatics when affixing the pipe mount section to the band.

Once the pipe mount section is affixed to the band, the scanner frame section can be placed in its closed (down) position, resulting in the scanners being spring loaded and positioned against the pipe.

The scanner frame section comprises two, and preferably three, rails for mounting scanners. In embodiments where the scanner frame section comprises three rails, the scanner frame section allows for the mounting of multiple sensors, for example, up to four PA transducers, and four ToFD transducers, may be mounted, to allow for scanning the ID and OD simultaneously.

In certain embodiments, the scanner frame section may comprise at least one rail member that is hollow, which can be used as a conduit for water. This greatly simplifies the number of water hoses that need to be attached to the scanner frame section to provide water to the transducers.

The aforementioned improvements allow for a scanner assembly that is much lighter, more compact, and easier to affix to a pipe band than prior art scanner assemblies. In certain embodiments, the inventors have been able to reduce the weight of the scanner assembly, fully loaded with scanners and water conduits, from the prior art scanner assembly of 83 lbs to about 38 lbs. This is highly advantageous since it can be carried by one person, and does not require additional equipment to load it onto a pipe section.

One embodiment of the scanner assembly will now be explained in greater detail with reference to the drawings.

Shown is a partial view of exposed steel pipe 20 at a girth weld region. Steel pipe 20 is typically coated with corrosion coating 22 and insulation coating 24. A mounting band 26 is affixed to the bare steel pipe 20. Typically, the mounting band 26 is clamped to the bare steel pipe 20 with sufficient hoop strength that it can support the scanner assembly without slippage or displacement. The mounting band 26 can be, for example, a CRC welding band as previously known in the art. The mounting band 26 has a gear track (not shown) and wheel engagement surfaces 28, 29 for receiving the groove of the wheels 36, 38 of the scanner assembly 30.

Scanner assembly 30 comprises two sections—pipe mount section 32 and scanner frame section 34.

Pipe mount section 32 is configured for mounting and circumferential displacement around mounting band 26. Pipe mount section 32 comprises fixed wheels 36 which have grooves for engaging with mounting band wheel engagement surface 26. Pipe mount section 32 also comprises displaceable wheels 38, for engaging with mounting band wheel engagement surface 29. Displacable wheels 38 are spring loaded and configured on a cam which provides the displaceable wheels with linear motion on rotation of handle 40. Handle 40 is shown in "open" position in FIG. 1, and in "closed" position in FIG. 2. With the handle 40 in the open position, there is sufficient distance between fixed wheels 36 and displaceable wheels 38 to remove or place the scanner assembly 30 onto the mounting band 26. Turning handle 40 from open position to closed position provides linear displacement of displaceable wheels 38 towards fixed wheels 36, clamping the pipe mount section 32, and, as a result, the entire scanner assembly 30 to the mounting band 26. Once clamped onto mounting band 26, the scanner assembly 30 may freely rotate around the band 26, and as a result, around the circumference of the pipe 20, through the free rotation of wheels 36, 38.

Though spring loaded, grooved, metal wheels 36, 38 are used, it would be understood that other wheel configurations may be used, for example, non-grooved, non-spring loaded, solid rubber wheels.

Figure 1:
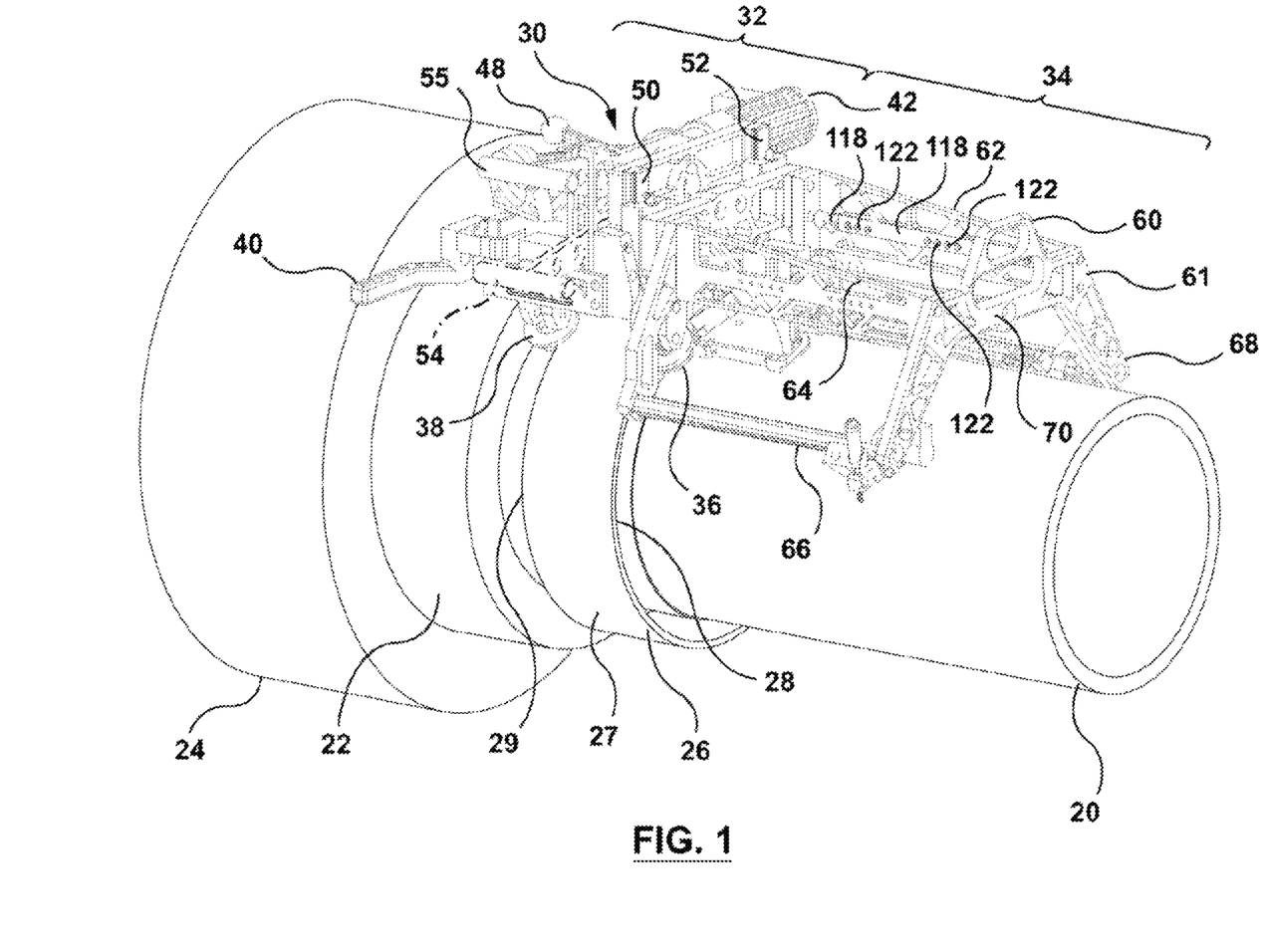
FIG. 1 is a perspective view of an example of the ultrasonic scanner assembly attached to a band which is affixed to a pipe at a cutback region.
Figure 2:
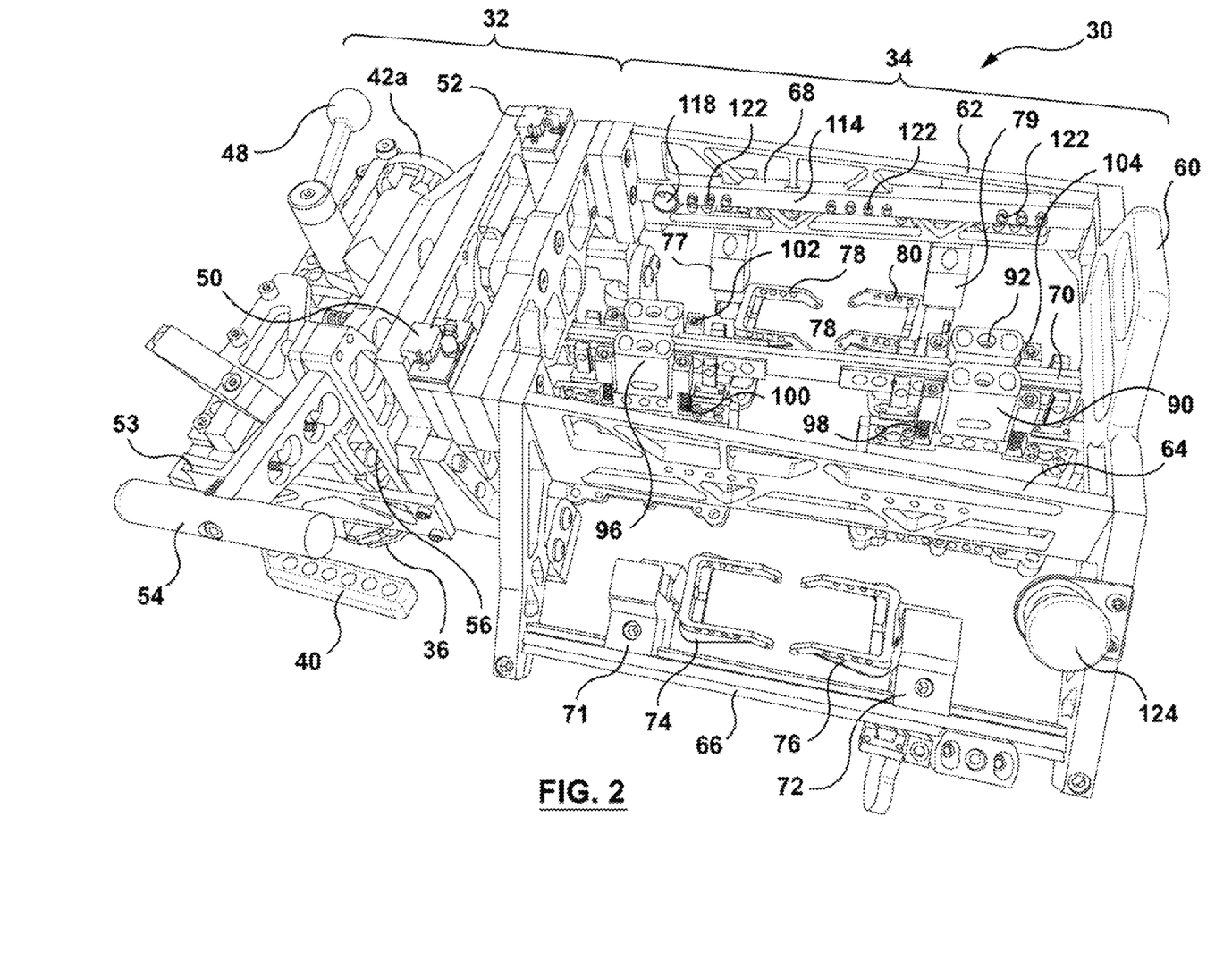
FIG. 2 is a top perspective view of a further example of the ultrasonic scanner assembly.
Figure 3:
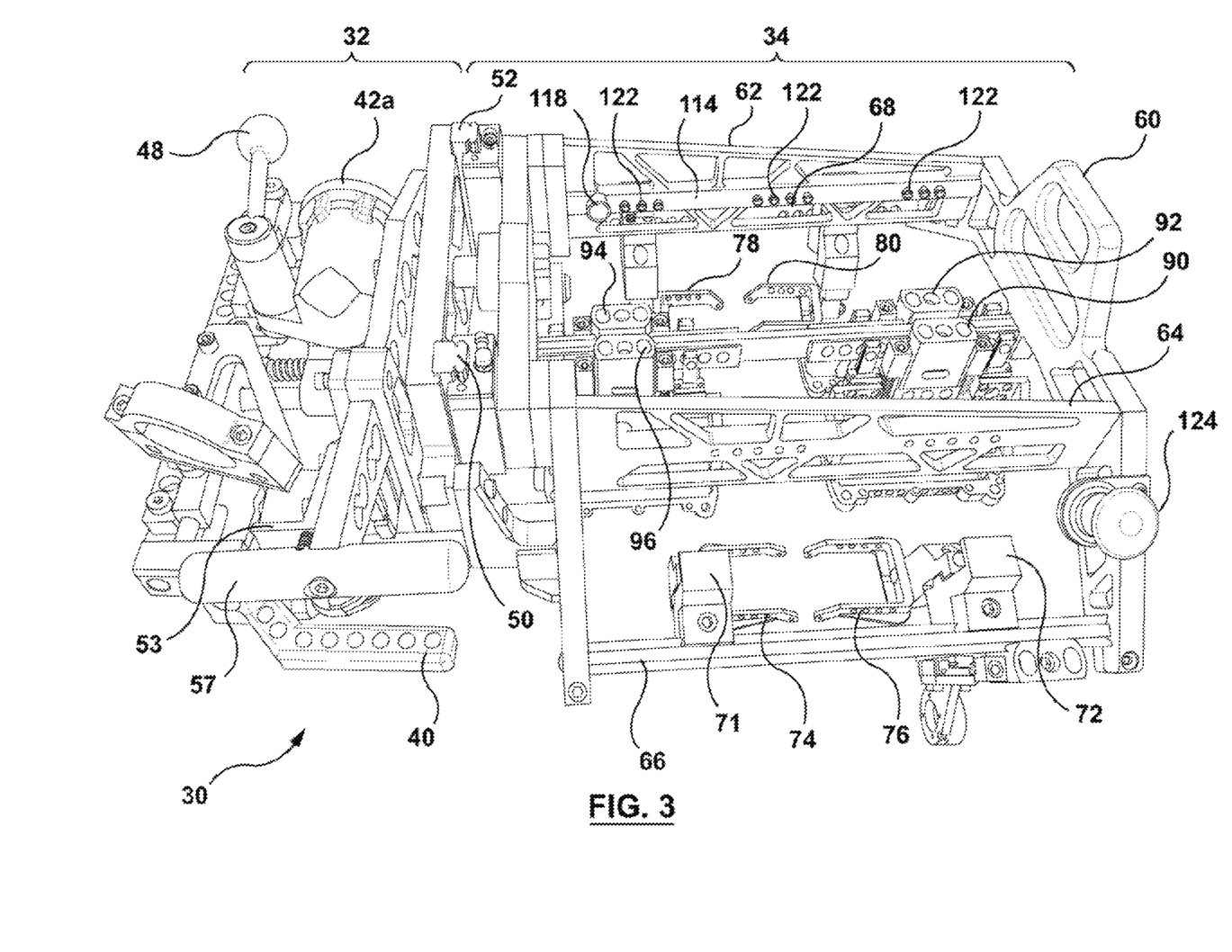
FIG. 3 is a further view of the assembly of FIG. 2.
Figure 4:
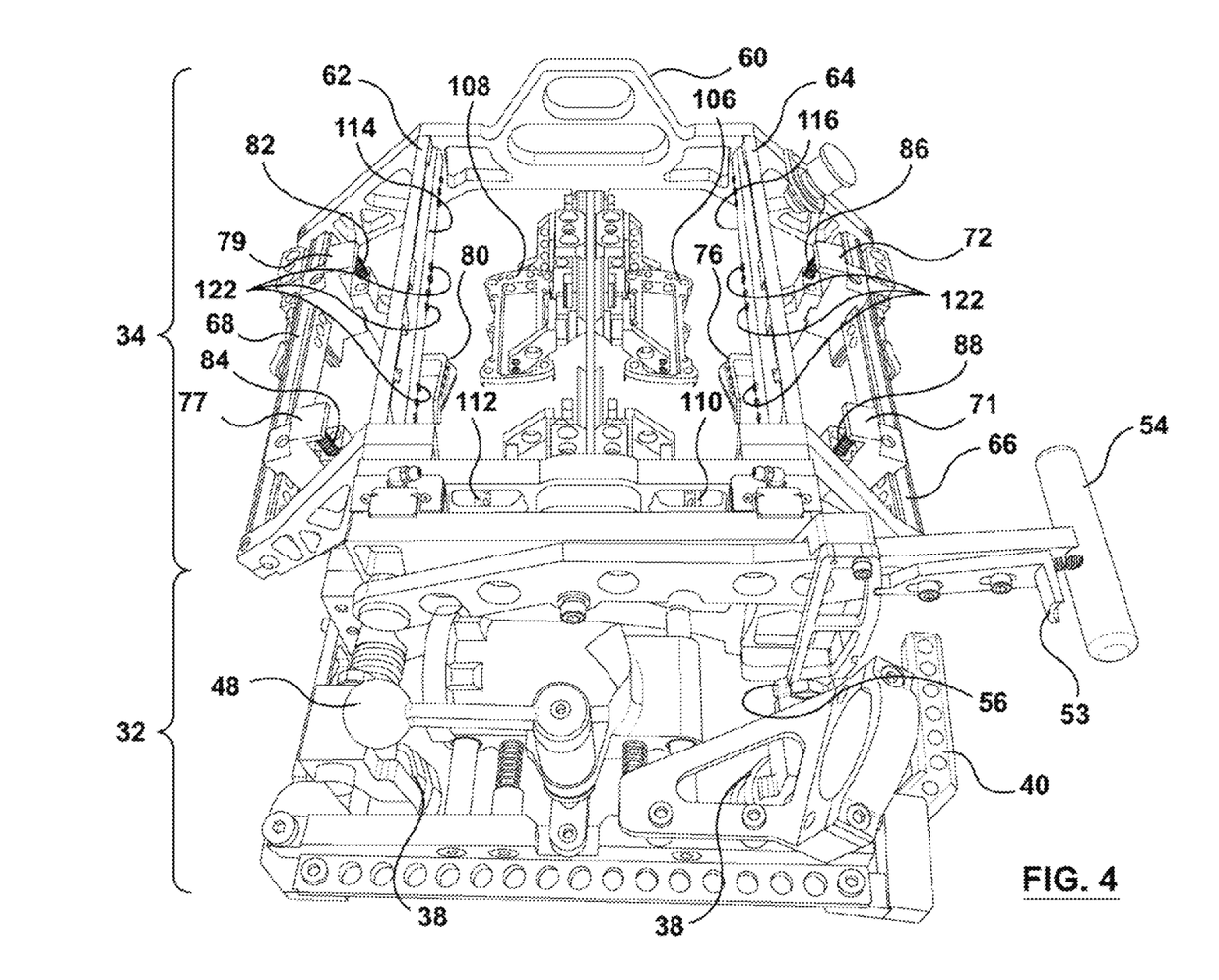
FIG. 4 is a further view of the assembly of FIG. 2.

Pipe mount section 32 also comprises motor 42 (FIG. 1 shows motor 42, whereas FIGS. 2-4 show motor mount 42*a*, on which a motor may be mounted), which, as shown in FIG. 1, is a simple electric motor configured to turn a gear 44. Gear 44 may be moved from an engaged position, where gear 44 engages mating teeth on gear track 27 of mounting band 26, to a disengaged position, where gear 44 does not engage the gear track 27 of the mounting band 26 (for example, in the disengaged position, gear 44 may spin freely). Gear 44 can be moved from its engaged position to its disengaged position (and back) by rotating lever 48.

When the scanner assembly 30 is clamped onto the mounting band 26, with gear 44 is in its disengaged position, the scanner assembly 30 may freely rotate around the pipe 20. With gear 44 in its engaged position, it will rotate around the pipe 20 when the gear 44 is rotated by the activation of motor 42. Since motor 42 is configured to be able to rotate the gear 44 in both directions, and since motor 42 has a brake when it is not activated, rotation of the scanner assembly 30 can be controlled, both in speed and direction, by the controlling of motor 42.

Pipe mount section 32 is connected to scanner frame section 34 through a set of linear ball bearing slides 50, 52, which allow linear, lateral motion to the scanner frame section 34 relative to the pipe mount section 32. The scanner frame section 34 can be locked in place along the slides 50, 52 in at least two positions, with a first, closed position shown in FIG. 1, with the scanner frame section 34 positioned relatively proximal to the pipe 20, and a second, open position, shown in FIG. 2, with the scanner frame section 34 positioned relatively distal to the pipe 20. The locking and unlocking of the scanner frame section 34 in open or closed position, and the moving of the scanner frame section 34 from one position to another, can be controlled using different means. As shown in FIG. 1, T-bar handles 54, 55 are squeezed together to disengage teeth which lock the scanner frame section in place; once the T-bar handles 54, 55 are squeezed together, they may be moved up or down, as a pair, to move the scanner frame 34 from one position to the other. An alternative mechanism is shown in FIG. 2, with a single T-bar handle 54, having a spring biased locking pin 56 which is unlocked by pulling pin lever 53 towards T-bar handle 54. In this configuration, pin lever 53 is pulled towards T-bar handle 54 to unlock the locking pin 56, allowing scanner frame section 34 to freely move along slides 50, 52, to the desired position, for example, a closed position by pushing down on the T-bar handle 54, or an open position by pulling up on the T-bar handle 54.

Scanner frame section 34 comprises integrated handle 60 for ease of transport and manipulation, which may be anywhere on the scanner frame section 34, but as shown is located on the top of the distal end 61 of the scanner frame section 34. Extending from the pipe mount section 32 to the distal end 61 are a plurality of rails 62, 64, 66, 68, 70. As shown, the scanner frame section comprises a middle rail 70, and two external rails 62, 64. Each of external rails 62, 64 has an extension rail 66, 68. The rails provide mounting support for scanners.

In order to better show certain aspects of the invention, certain other aspects of the scanner frame section 34 are missing from FIG. 1, and only seen in FIGS. 2-4. As shown in those figures, Extension rails 66 comprises adjustable scanner mounts 71, 72. Each scanner mount 71, 72 comprises a horseshoe mount 74, 76. When mounted on the pipe at the girth weld, the scanner mounts 71, 72 are configured, or adjusted to be configured such that each of horseshoe mounts 74, 76 are located on opposite sides of the girth weld. Horseshoe mounts 74, 76 are of a size and shape that enable the mounting of a scanner (not shown) to each—thus, in use, each of horseshoe mounts 74, 76 are mounted with a scanner configured to scan opposing sides of the girth weld.

Extension rail 68 similarly comprises scanner mounts 77, 79 each having horseshoe mounts 78, 80, respectively.

Scanner mounts 71, 72, 77, 79 also comprise spring loaded mechanisms 82, 84, 86, 88 for biasing the horseshoe mounts 74, 76, 78, 80 towards the pipe. In preferred embodiments, the total displacement distance for the spring loaded mechanisms 82, 84, 86, and 88 is less than the displacement distance of the scanner frame section 34 when it is moved from an open to a closed position. Thus, when the scanner frame section 34 is in an open position, the spring loaded mechanisms 82, 84, 86 and 88 are distended, with no pressure on the springs; when the scanner frame section 34 is in a closed position, the spring loaded mechanisms 82, 84, 86 and 88 are "loaded" and provide downward force from the scanners (not shown) to the pipe 20.

Middle rail 70 similarly comprises scanner mounts, though as shown, middle rail 70 comprises four scanner mounts 90, 92, 94, 96, each comprising spring loaded mechanisms 98, 100, 102, 104 and square mounts 106, 108, 110 and 112.

In certain embodiments, each of the horseshoe mounts 74, 76, 78, 80 houses a ToFD scanner/transducer, and each of the square mounts 106, 108, 110, 112 houses a phased array scanner. However, the scanner may use any suitable scan head technology, including any suitable arrays and configurations.

In certain preferred embodiments, and as shown, external rails 62, 64 also act as, or comprise, water conduits 114, 116. Water conduits 114, 116 comprise water inlets 118, 120 and water outlets 122. Integrated water conduits 114, 116 allow for a much more elegant and clean transmission of water from a central source to the scanners, resulting in a requirement for fewer external tubes, less tangling, and less water supply failure.

The scanner assembly may also comprise safety cutoff button 124, which provides a power cut-off to all electrical elements (for example, motor 32 and any scanners attached to scanner mounts.

The scanner assembly 30 may be configured for use on pipes of different diameters, and with bands of different diameters, simply by adjusting the travel on displaceable wheels 38, or, in some instances, by replacing wheels 36, 38 with wheels of different size.

The scanner assembly does not require the use of compressed air intakes (and the resultant hoses and compressed air source), does not require air cylinders, and does not require a compressor. The scanner thus has less moving parts, may be lighter, and may be cheaper to manufacture, compared to conventional scanners.

The scanner assembly may articulate to accommodate pipes of different diameters, which may be useful since most projects typically have multiple pipe sizes. For example, the scanner may have three ranges of extension rails 66, 68 to accommodate pipe sizes ranging from about 2.75" to 48".

The scanner assembly 30 is used as follows.

Scanners, for example commercially available ToFD scanners, are mounted to horseshoe mounts 74, 76, 78, 80, as well as square mounts 106, 108, 110, 112. A water supply is connected to water inlets 118, 120 and water hoses are connected from water outlets 112 to an appropriate water input on each of the scanners, as appropriate.

The scanner frame section 34 is put in open position by unlocking and pushing upwards on the T-bar handles. The displaceable wheels 38 are put in their open position by opening wheel handle 40. The scanner assembly 30 is then placed on the mounting band 26, with fixed wheels 36 and displaceable wheels 38 to either side of the band 26 and aligned with the wheel engagement surfaces 28, 29. The band had previously been clamped to the pipe, at a suitable distance such that, when the scanner assembly 30 was mounted, the horseshoe mounts 74, 76, 78, 80 were would be at the desired position, such that sensors would be pointed to either side of the weld.

The wheels 36, 38 are locked to the mounting band wheel engagement surfaces 28, 29 by closing wheel handle 40. The scanner assembly 30 can now be manually moved around the mounting band 26, to ensure it is properly attached. The scanner frame section 34 can now be lowered onto the pipe, by unlocking T-bar handles 54, 55 and pushing down on the T-bar to lower the scanner frame section 34 on linear slides 50, 52. The water is then turned on, and the motor gear 44 engaged to the mounting band gear track 27 by turning lever 48. The motor and scanners can now be engaged.

In a further embodiment, shown in FIGS. 5-9, T-bar handle 54 acts both as means for moving the scanner frame section 34 from the closed position (shown in FIG. 7) to the open position (shown in FIG. 8) and for engaging (shown in FIG. 7) and disengaging (shown in FIG. 8) the motor gear 44 from the mounting band gear track 27. In this manner, the scanner frame section 34 can be moved to an open position, clear of the mounting band gear track 27, so that it can be easily rotated around or removed from the pipe section, in one single action. This is further illustrated in FIG. 9, which shows the scanner frame section 34 in the open position and motor gear 44 disengaged from mounting band gear track 27. When T-bar handle 54 is moved downwards (towards the apparatus) from this position, the scanner frame section 34 will move to the closed position, and the mounting band gear track 27 will be engaged by motor gear 44.

Figure 5:
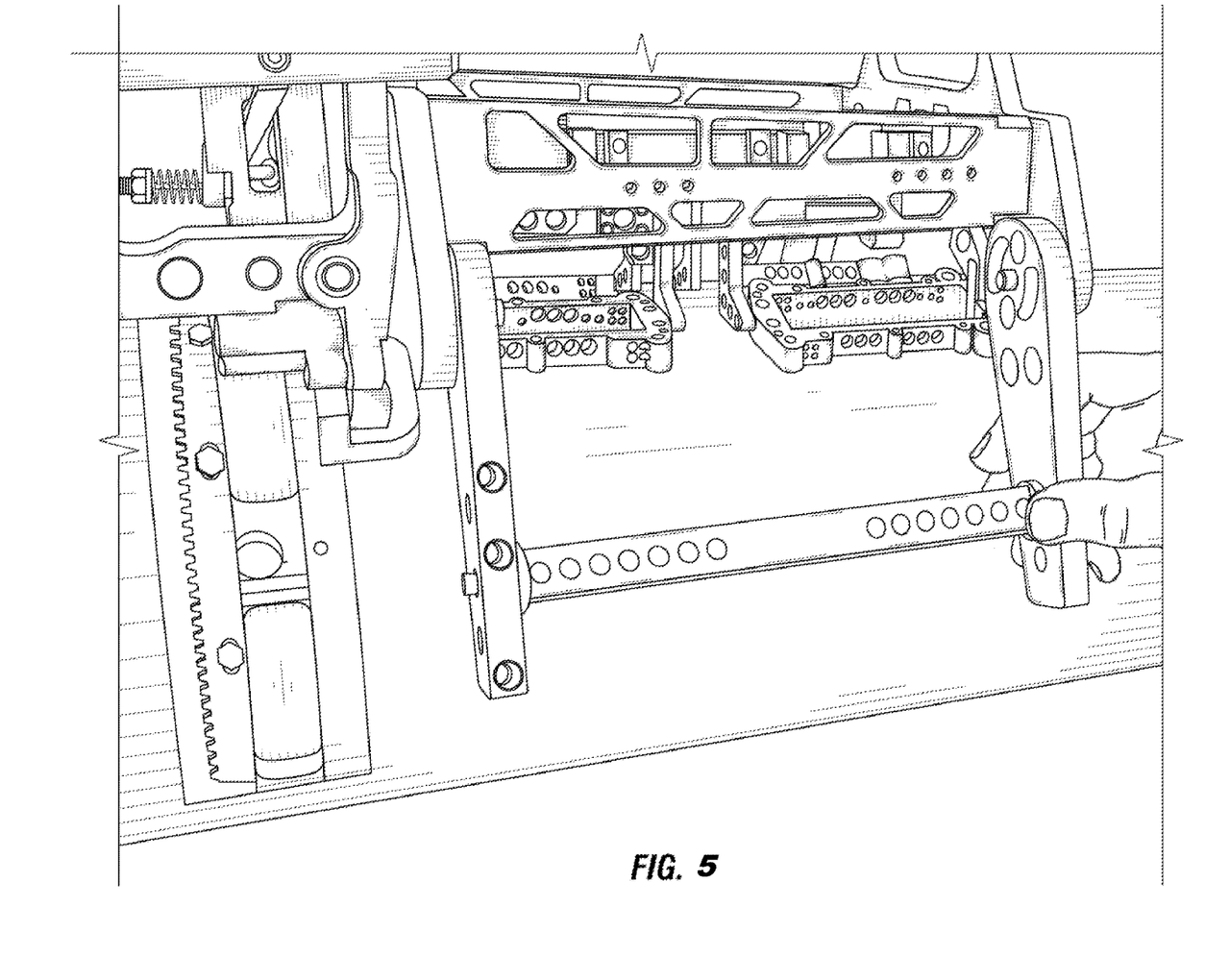
FIG. 5 is a photograph of a further embodiment of the ultrasonic scanner assembly attached to a band which is affixed to a pipe at a cutback region, showing articulable extension rails in a first position.
Figure 6:
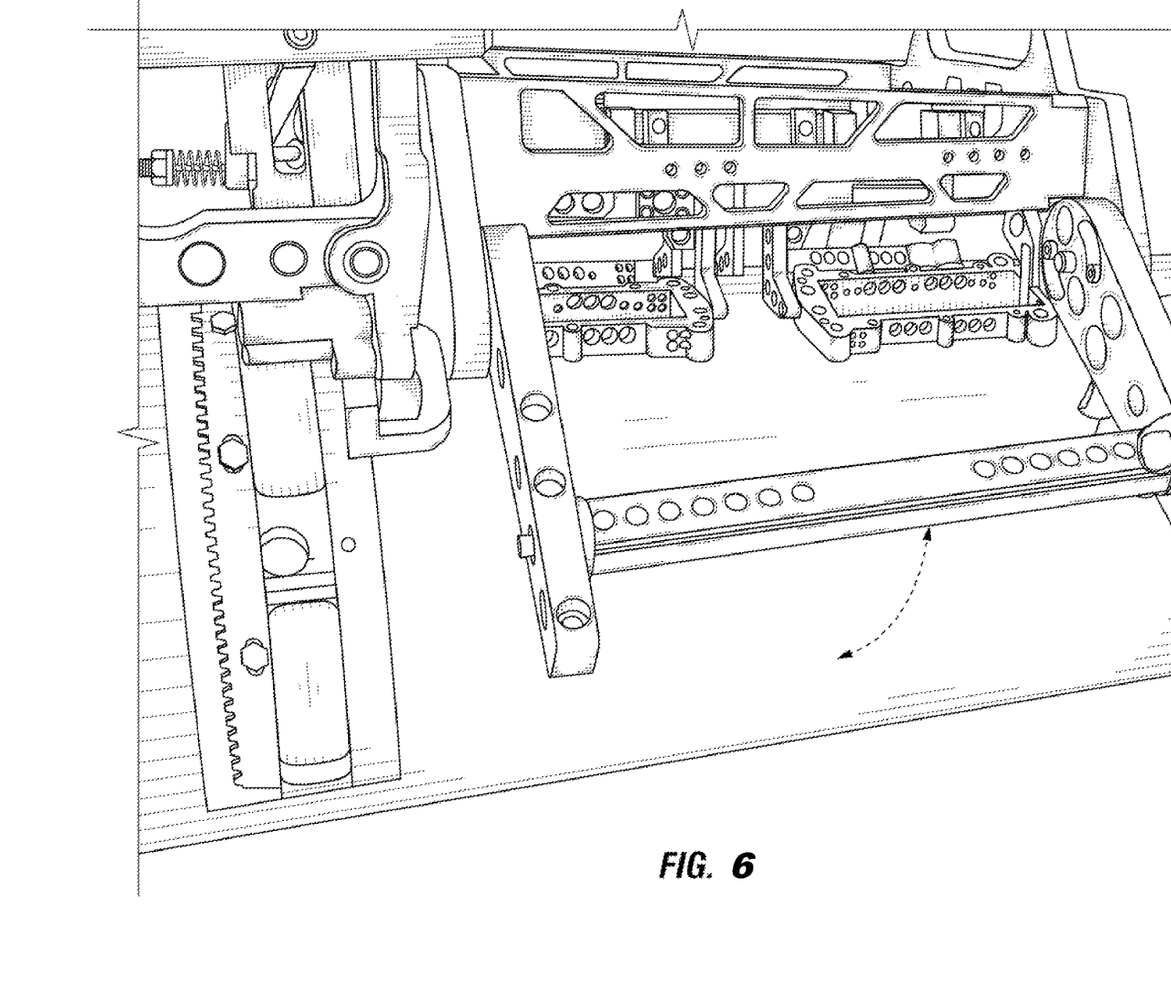
FIG. 6 is a photograph of the ultrasonic scanner assembly of FIG. 5, showing the articulable extension rails in a second position.
Figure 7:
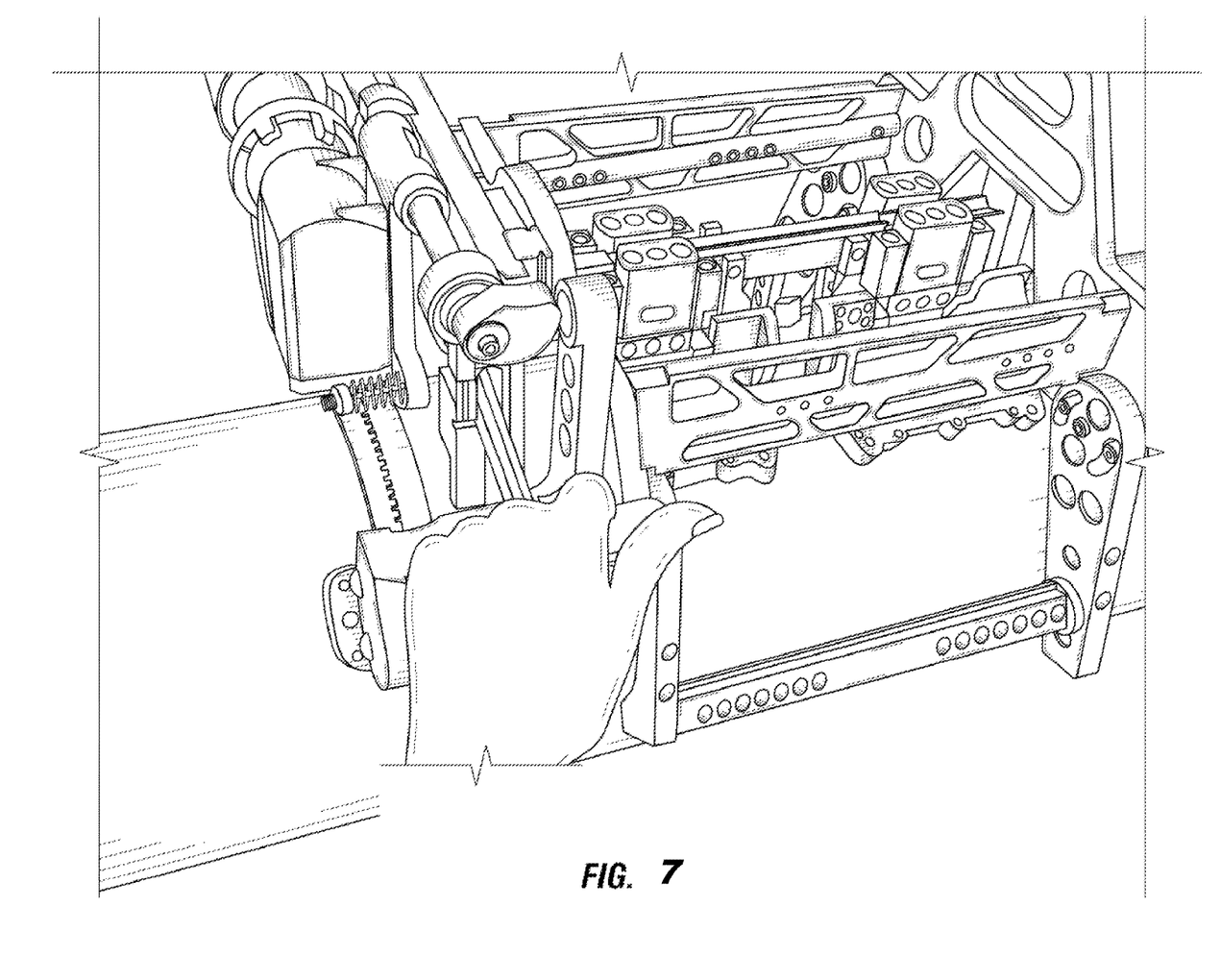
FIG. 7 is a photograph of the ultrasonic scanner assembly of FIG. 5, showing the scanner frame section in a first, closed position, in relation to the pipe mount section and the pipe.
Figure 8:
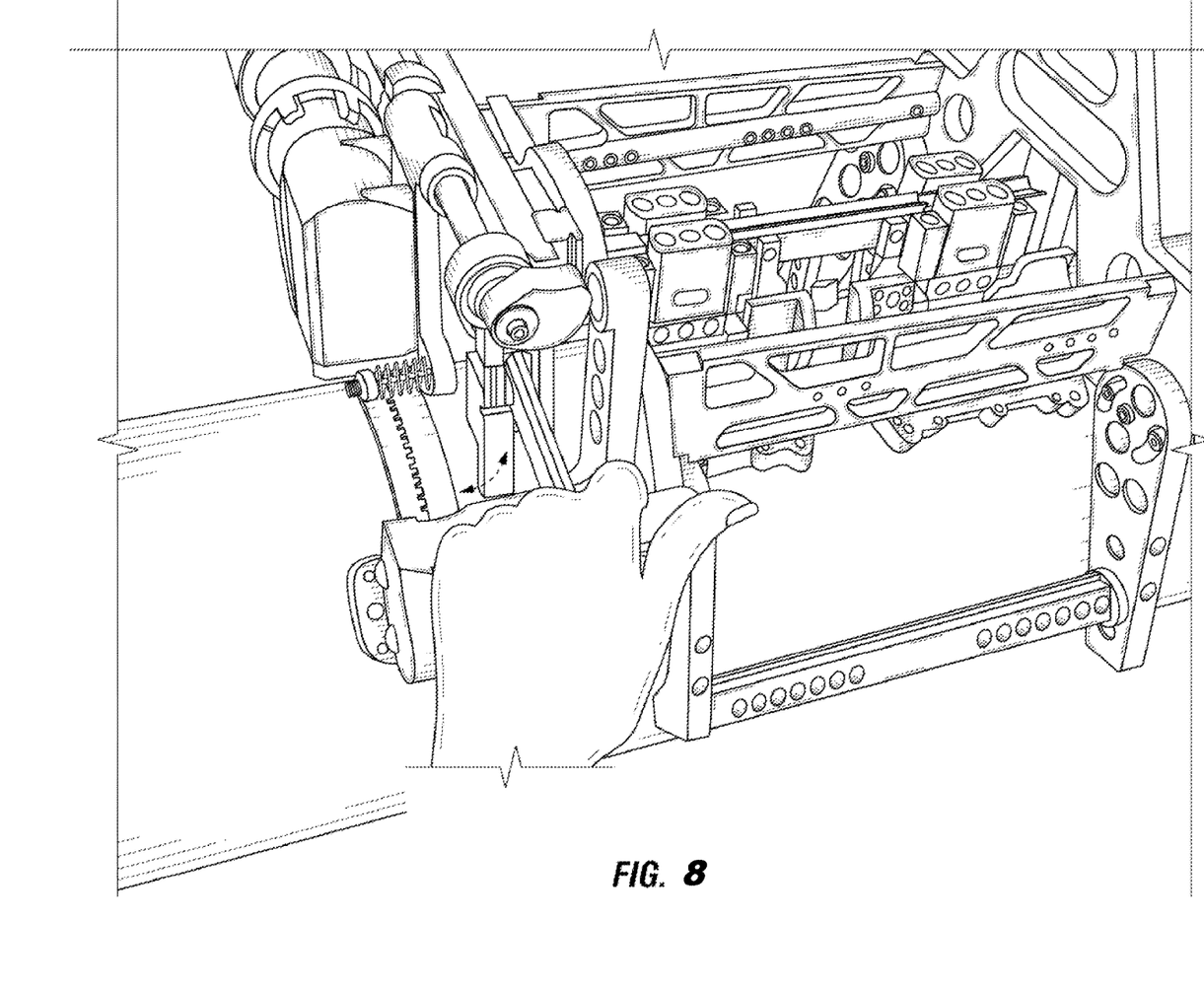
FIG. 8 is a photograph of the ultrasonic scanner assembly of FIG. 5, showing the scanner frame section in a second, open position, in relation to the pipe mount section and the pipe.
Figure 9:
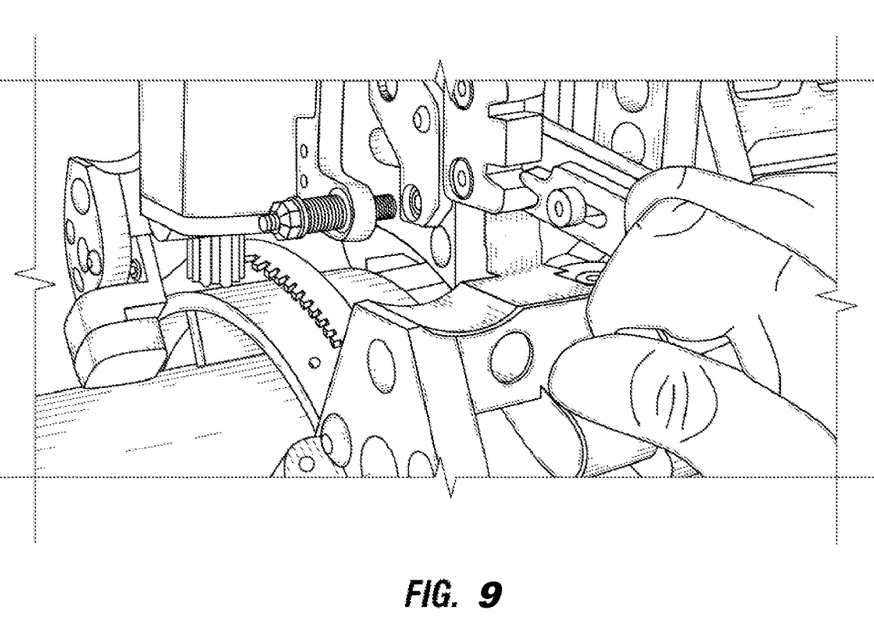
FIG. 9 is a further view of the assembly and position of FIG. 8.

The embodiment shown in FIGS. 5-9 also show a further optional feature and embodiment of the apparatus, specifically, of the extension rails 66, 68. In this embodiment (which could be adapted to any apparatus herebefore shown), each of extension rails 66, 68 are connected to external rails 62, 64 (respectively) by rail arms 142, having pivot means 140. Pivot means 140 enable the extension rails 66, 68 to pivot/articulate relative to the frame section 34, to allow for positioning the extension rails 66, 68 in various positions as desired to adjust to pipes of different diameters. For example, as shown in FIG. 5, extension rails 66, 68 are positioned for placement on a pipe of narrower diameter, relative to the positioning as shown in FIG. 6, which shows extension rails 66, 68 pivoted to a configuration for placement on a wider pipe. It would be appreciated that, throughout FIGS. 5-9 though in certain cases only extension rail 66 is shown, extension rail 68 is present and its mirror, on the opposing side of frame section 34.

Pivot means 140 are configured to be lockable in at least two positions, preferably at multiple positions each preconfigured for use on a pipe of a different, specific, diameter. For example, pivot means 140 may comprise two rotating elements, one having a spring biased pin, the other having a plurality of holes configured for receiving said pin, with each of said plurality of holes spaced apart and each corresponding to a different extension position (not shown).

Also as shown in FIGS. 5-9, due to its configuration, the scanner apparatus is much narrower than previous known scanners. Specifically, as shown in FIGS. 5-9, the entire scanner assembly is about 15 inches wide, and much lighter than previous known scanners. The weight and width allows it to be cantilevered from a much narrower mounting band—as shown in FIGS. 5-9, the mounting band 26 is less than 3 inches wide. This improved configuration allows for ease of transport and a shorter, cheaper, more robust field joint, since the total width (scanner+band) of about 15 inches allows for a cutback region of 8 inches on each pipe length (for a total of about 16 inches when the two pipe lengths are joined); this smaller cutback region is greatly advantageous since it provides a shorter, cheaper, more robust field joint, and a greater portion of the pipe covered in a factory coating.

The embodiments of the present disclosure described above are intended to be examples only. The present disclosure may be embodied in other specific forms. Alterations, modifications and variations to the disclosure may be made without departing from the intended scope of the present disclosure. While the system, devices and processes disclosed and shown herein may comprise a specific number of elements/components, the systems, devices and assemblies could be modified to include addition or fewer of such elements/components. For example, while any of the elements/components disclosed may be referenced as being singular, the embodiments disclosed herein could be modified to include a plurality of such elements/components. Selected features from one or more of the above-described embodiments may be combined to create alternative embodiments not explicitly described. All values and subranges within disclosed ranges are also disclosed. The subject matter described herein intends to cover and embrace all suitable changes in technology. All references mentioned are hereby incorporated by reference in their entirety.

The invention claimed is:

1. A scanner assembly for external inspection of a pipeline girth weld, the apparatus comprising:
a pipe mount section, mountable by mounting means to a mounting band affixed to the pipeline and capable of rotating around the circumference of the pipeline by travelling around the mounting band;
a scanner frame section, having scanner mounts;
wherein the scanner frame section has displacement means relative to the pipe mount section, such that the scanner frame section can be slidably displaced in relation to the pipe mount section from a first position in which the scanner frame section is proximal to the pipe to a second position in which the scanner frame section is distal to the pipe, when said pipe mount section is affixed to the pipeline.

2. The scanner assembly of claim 1, wherein the displacement means comprises at least one linear ball bearing slide.

3. The scanner assembly of claim 1, wherein each of the scanner mounts comprises a scanner attachment means and a spring loaded mechanism, having a travel distance, for biasing the scanner attachment means towards the pipeline.

4. The scanner assembly of claim 3, wherein the travel distance of the spring loaded mechanism is shorter than a travel distance of the lateral displacement of the scanner frame section.

5. The scanner assembly of claim 1, having at least four scanner mounts.

6. The scanner assembly of claim 5, having at least 8 scanner mounts.

7. The scanner assembly of claim 1, wherein the mounting means comprise at least one fixed wheel and at least one opposing displaceable wheel, configured such that the at least one displaceable wheel can displace to frictionally mount or clamp onto a wheel engagement surface of the mounting band.

8. The scanner assembly of claim 1, wherein the pipe mount section also comprises a track engagement means, driven by a motor, capable of engaging and disengaging with a track running along the circumference of the mounting band.

9. The scanner assembly of claim 1, wherein the scanner mounts are configured on at least two rails cantilevered from the pipe mount section to a distal end.

10. The scanner assembly of claim 9, wherein the scanner mounts are configured on at least three rails cantilevered from the pipe mount section to a distal end.

11. The scanner assembly of claim 1 or 9, further comprising an integrated water transportation system.

12. The scanner assembly of claim 11, wherein the integrated water transportation system comprises a metal conduit running along a length of one or more rails that are cantilevered from the pipe mount section to a distal end.

13. The scanner assembly of claim 9, having extension rails generally parallel to the at least two rails and extending therefrom.

14. The scanner assembly of claim 13, wherein the extension rails extend from the at least two rails via an articulating or pivoting member, which allows the extension rails to pivot between at least two positions, each accommodating placement onto pipeline of different circumference.

15. The scanner assembly of claim 14 wherein the at least two positions are lockable positions.

* * * * *